3,003,014
GAS-TIGHT SEALED ALKALINE ACCUMULATORS
Fritz Philipp, Haspe-Hagen, Westphalia, and Werner Tietze, Hagen, Westphalia, Germany, assignors to Accumulatoren-Fabrik Aktiengesellschaft, Hagen, Westphalia, Germany, a corporation of Germany
Filed Jan. 10, 1957, Ser. No. 633,425
Claims priority, application Germany Jan. 11, 1956
10 Claims. (Cl. 136—13)

The invention relates to the improvement of gas- and liquid-tight sealed alkaline accumulators and especially to the improvement of accumulators with electrodes which are extremely thin and have large surfaces, e.g., band-electrodes.

According to known procedures gas-tight sealed alkaline accumulators were made in such manner that the negative electrodes had a greater capacity than the positive electrodes, and that the negative electrodes at the time of sealing the accumulator had a higher charge capacity than the positive electrodes. With such electrodes there were employed separators of various types defining hollow spaces in which the gases generated upon charging could accumulate, so that they could come in contact with the surfaces of the oppositely situated electrodes of opposite polarity and thereby be absorbed. Due to the higher charge capacity of the negative electrodes at the time of hermetically sealing the accumulator in accordance with these techniques and the contact of the generated oxygen with the active mass of the negative electrodes in the hollow spaces of the separators a hydrogen generation during charging was suppressed.

More recently techniques have been devised to dispense with the higher charging capacity of the negative electrode at the time of hermetically sealing the accumulator. In this case the electrolyte is held in the pores of the electrodes and of the separators, which latter are impervious to the gases generated on the electrodes, due to the retained electrolyte. Due to this electrolyte retention, portions of the negative electrode which are exposed by the separators come in contact with the gas space in the accumulator. The gas absorption takes place in such a manner that the generated oxygen comes in contact with the exposed portions of the negative electrode, here is electrochemically reacted and as a result of this reaction the negative electrode is so far depolarized, i.e., its potential is elevated, that a hydrogen generation during charging is made impossible. Since the oxygen absorption takes place at the same great speed with which the oxygen is generated at the positive electrodes the provision of a higher charge capacity for the negative electrode to suppress generation of hydrogen is rendered unnecessary.

A condition for the working of such electrodes is that the contact surfaces between the negative electrode and the gas space defined in the accumulator is sufficiently large. To this end as an example it has been proposed to split the negative electrode into two partial electrodes between which there is provided a gas-filled gas space. A similar effect is also achieved if portions of the negative electrode are roughened, for example, the plate edges extend to a large extent into the gas space whereby these portions serve to increase the contact surfaces with the gas.

These measures can also be applied to the known accumulators with pocket or sintered electrodes. These measures, however, are not suitable in such cases where the electrodes are already very thin and thus no longer divisible. In the case of thin electrodes it has also been shown by experiments that the contact surfaces of the edges of the negative electrodes extending into the gas space is too small in order to guarantee a rapid gas absorption.

It is an object of the present invention in case of compact build-up and extremely thin electrodes with large surfaces (for example band-electrodes, sintered-foil electrodes and other very thin electrode embodiments which can be rolled, plaited, wrapped or stacked) to effect a sufficient improvement of the gas absorption and to provide by means of electrode units thus prepared gas-tight sealed alkaline accumulators exhibiting only a small internal pressure, i.e., less than one atmosphere in excess of normal air pressure.

In accordance with the present invention, gas-tight sealed alkaline accumulators formed from compact built-up electrodes (for example, with band-electrodes or sintered foil electrodes by variation of the customary structure) are provided on the negative electrodes with a metallic electrochemically inactive or inert insert on one or both sides, the insert constituting a penetratable body, i.e., porous or perforated, electrically connected with the negative electrode and unfilled with active mass. The spaces in this metallic conductive insert or body, provided on one or both surfaces of the negative electrode, are sufficiently large so that they are not filled with electrolyte and they are in contact with the gas spaces defined in the accumulators. Naturally, the surfaces of this metallic conductive body are covered with a thin film of electrolyte.

Due to the porosity of the metallic conductive insert which overlies the negative electrode and the contact of its spaces with the gas space defined in the accumulator, the oxygen generated in the accumulator is in relatively large surface contact with the metallic insert and at the same time with portions of the surface of the negative electrode. On this large surface there therefore takes place a very rapid absorption of oxygen and depolarization of the negative electrode. As a result of this depolarization of the negative electrode, in known manner generation of hydrogen upon charging is inhibited.

Due to the large surface contact between the gas space on the one hand and the porous metallic conductive insert and the surfaces of the negative electrode on the other hand, and due to the high rate of oxygen absorption, only small overpressures are generated in the sealed alkaline accumulators according to the present invention.

The porous metallic conductive inserts superposed on the negative electrodes and electrically connected therewith can be made of the following materials:

(1) From large or small mesh nickel wire webs or nickel-coated metal wire webs alone or in combination with a second large or small mesh similar web so that a double structure of metal webs is provided.

(2) From expanded metal alone or in electrical combination with large or small mesh nickel wire webs or metal wire webs.

(3) From a fleece of metal wool, the individual metal fibers of the fleece at their contact points with each other being capable of sintering.

(4) From superficially metallized porous or perforated films or non-conductive material, e.g., out of fibrous material or synthetic foils.

(5) From combinations of two or more of the foregoing embodiments.

This gas-penetrable metallic insert on the negative electrode is so constructed according to the invention that it exposes substantially the total active surface of the negative electrode and is electrically connected therewith. The separators provided in the accumulator are then spaced from either one or both sides of the exposed negative electrodes by the respective inserts. The so constructed negative electrode systems are then in conventional manner combined with positive electrode systems, the positive electrodes being spaced from the negative electrodes by the separators.

If the so constructed electrode unit is spirally wound, then the porous metal inserts are wound substantially simultaneously with the negative electrode systems and additionally surrounds the complete electrode winding, thereby further to increase the contact surface between the gas space and the metal inserts which are maintained at a negative potential. In this case the surface of the metal insert or inserts (coverings) is also greater than the surface of the negative electrodes. It is also possible that the surface of the metal inserts can be smaller than the surface of the negative electrodes. In known manner the electrolyte is held through capillarity in the pores of the electrodes and separators to ensure a rapid gas absorption within the accumulator. The pores of the separators are so fine that the gas bubbles generated on the electrodes cannot penetrate through the liquid-saturated separators.

The working principle of gas-tight sealed alkaline accumulators including the novel electrode units which comprise negative electrode systems exposed on one or both sides through a gas-penetrable metal or metallized conductive insert or body resides in the fact that due to the compact structure of the accumulators even with extremely thin electrodes there is provided a sufficiently large contact surface between the gas space and the portions of the accumulators which are maintained at negative potential, which was not possible with previously known structures.

The invention will now be described more specifically with reference to the accompanying drawings, wherein.

Figure 1:
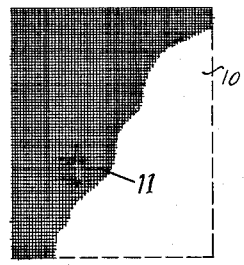
FIGS. 1 to 7 are front elevations of an electrode covered with different metallic inserts, with portions of the metallic inserts broken away.
Figure 2:
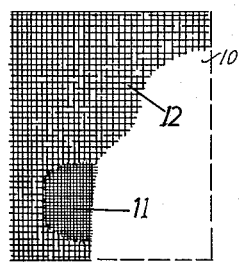

Referring now more particularly to FIGS. 1 to 7, the metal insert provided on the surface of the electrode 10 in FIG. 1 takes the form of a metal wire web 11. In FIG. 2 the web 11 is combined with a further web 12 of larger mesh size.

Figure 3:
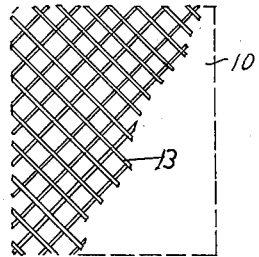
Figure 4:
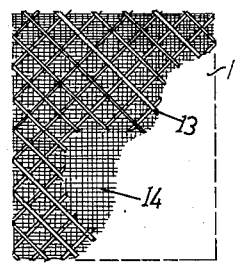

In FIG. 3 the metal insert comprises an expanded metal sheet 13 which in FIG. 4 is combined with a metal web 14.

Figure 5:
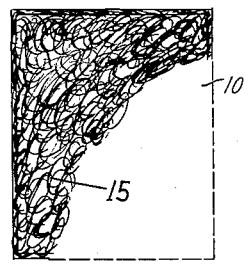

In FIG. 5 the metal insert comprises a fleece 15 of metal wool, the fibers of which can be sintered to each other at their contact points.

Figure 6:
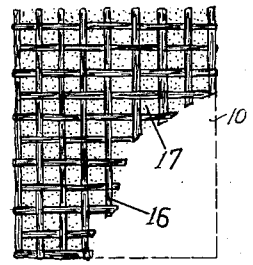

FIG. 6 shows a web 16 which is superficially metallized, the spaces 17 being provided between the threads of the web.

Figure 7:
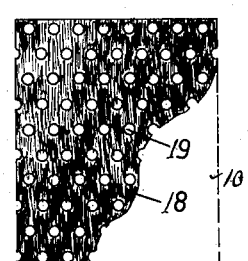

FIG. 7 shows a perforated metallized synthetic foil 18 which is provided with perforations 19 and which in addition can be corrugated.

Figure 8:
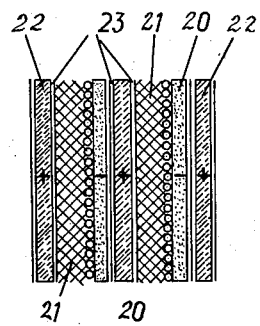
FIGS. 8 and 9 are vertical sections through different embodiments of electrode units in accordance with the present invention.

The construction of an electrode unit or stack according to the present invention can be seen in FIG. 8. A plurality of negative electrodes 20 are each exposed on one side through a porous metal insert which in this instance is formed of two layers of wire webs 21 of different mesh sizes in order to prevent shrinking. These metal webs are conductively connected with the respective negative electrodes 20. The negative electrode units comprising negative electrode 20 and the inserts 21 are alternated with positive electrodes 22 and porous non-conductive separators 23 are positioned on both sides of each positive electrode, the separators thus being directly adjacent each negative electrode on one side and being spaced from the other side of each negative electrode by the metal insert.

Figure 9:
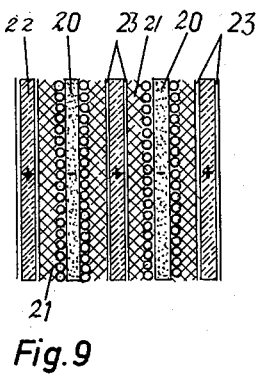

A further embodiment of the invention is shown in FIG. 9. In this case each negative electrode 20 is provided on both sides with metal inserts 21, so that the separators 23 are always spaced from the negative electrodes.

Figure 10:
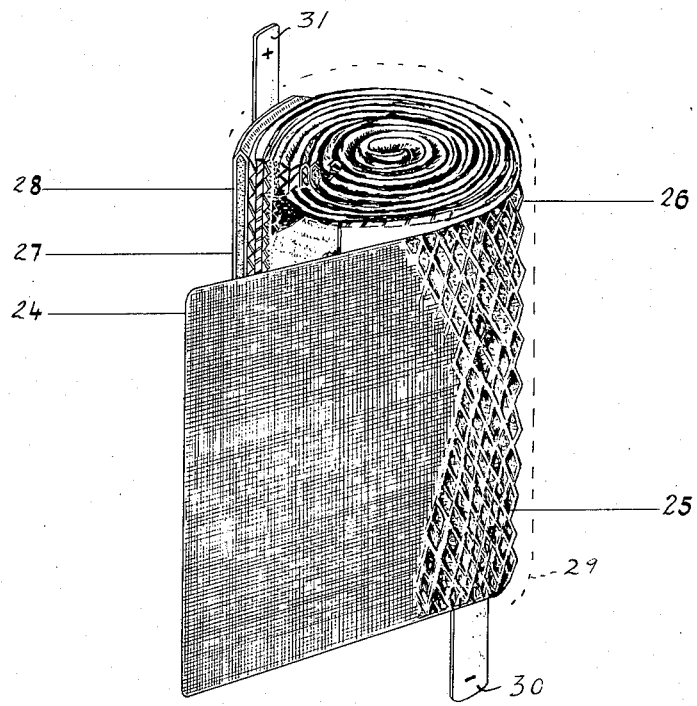
FIG. 10 is a perspective view of an accumulator produced in accordance with the present invention, with portions broken away.

An accumulator with a spirally wound electrode unit in accordance with the invention is shown in FIG. 10. In this case a composite body formed of nickel wire web 24 and expanded metal 25 is provided on one side of the negative electrode 26 and is electrically connected therewith to assume its potential. The negative electrode unit is isolated by separators 27 from the positive electrodes 28. This electrode structure is enclosed in a gas- and liquid-tight sealed housing 29 (shown in broken lines) and the accumulator is completed by contact posts 30 and 31.

The accumulators in accordance with the invention can of course be formed from electrodes which are stacked instead of being wrapped. Which electrode embodiment is used in combination with the metal inserts for the negative electrodes is immaterial. In similar manner there can be used sintered electrodes of the finest structure or band-electrodes, i.e., porous metallic supports the pores of which are filled with active mass through pasting or smearing, or other known electrodes.

Merely by way of illustration, the negative electrodes can be formed of cadmium, preferably sintered, while the positive electrode can constitute nickelous hydroxide or silver oxide. The electrolyte is conveniently potassium hydroxide and the separators can be formed or partially hydrolyzed polyvinyl acetate, cellophane, or other similar films. Other conventional combinations can be used without departing from the present invention.

The invention relates preferably to gas-tight sealed accumulators which at the time of gas-tight sealing do not require a higher charging capacity of the negative electrode. The advantages of the present invention can also be realized, however, when operating with other accumulators differing in immaterial respect from those herein described.

Various changes and modifications may be made without departing from the spirit and scope of the present invention and it is intended that such obvious changes and modifications be considered within the purview of the annexed claims.

We claim:

1. In a fluid-tight sealed alkaline storage battery, in combination, a substantially cylindrical electrode assembly comprising at least one negative electrode unit consisting essentially of a sheet-like negative electrode having two opposite faces and of a sheet-like electrically conductive electro-chemically inert foraminous insert formed with voids sufficiently large to prevent saturation thereof with electrolyte by capillary action and substantially free of active mass, said insert abutting at least one of said two opposite faces of said negative electrode; at least one positive electrode unit in alignment with and abutting said negative electrode unit and consisting essentially of a sheet-like positive electrode having two opposite faces at least one of which is located adjacent a negative electrode unit, and a sheet-like porous separator being gas-impermeable when saturated with liquid alkaline electrolyte, said separator abutting each of said faces of said positive electrode, said electrode units and said separator being spirally wound about each other to form said substantially cylindrical electrode assembly, with a portion of said insert forming the outer surface thereof; and an alkaline electrolyte fixed in said electrodes and said separator and forming a thin film on said foraminous insert, whereby gas developed during operation of said battery will come in contact with said electrically conductive insert, and build-up of excessive pressure within said sealed battery will be prevented by interaction between said gas and said insert.

2. In a fluid-tight sealed alkaline storage battery, in combination, at least one negative electrode unit consisting essentially of a sheet-like negative electrode having two opposite faces, and of a sheet-like electrically conductive electro-chemically inert forminous insert formed with voids sufficiently large to prevent saturation thereof with electrolyte by capillary action and substantially free of active mass, said insert abutting at least one of said two opposite faces of said negative electrode; at least one positive electrode unit in alignment with and abutting said negative electrode unit and consisting essentially of a sheet-like positive electrode having two opposite faces at least one of which is located adjacent a negative electrode unit, and a pair of sheet-like porous separators being gas-impermeable when saturated with liquid alkaline electrolyte, said separators, respectively, abutting one face of said positive electrode, said electrode units being spirally wound about each other; and an alkaline electrolyte fixed in said electrodes and said separator and forming a thin film on said foraminous insert, whereby gas developed during operation of said battery will come in contact with said electrically conductive insert, and build-up of excessive pressure within said sealed battery will be prevented by interaction between said gas and said insert.

3. A battery as defined in claim 1, wherein said insert comprises a nickel wire web.

4. A battery as defined in claim 1, wherein said insert comprises a nickel coated metal wire web.

5. A battery as defined in claim 1, wherein said insert comprises an expanded metal sheet.

6. A battery as defined in claim 1, wherein said insert comprises an expanded metal sheet in combination with a metal wire web.

7. A battery as defined in claim 1, wherein said insert comprises a plurality of wire webs each web being of a mesh size different from that of any other of the plurality of webs.

8. A battery as defined in claim 1, wherein said insert comprises a fleece of metal wool.

9. A battery as defined in claim 1, wherein said insert comprises a metallized non-conductive material formed from fibers.

10. A battery as defined in claim 1, wherein said insert comprises a metallized synthetic foil.

References Cited in the file of this patent

UNITED STATES PATENTS

| | | |
|---|---|---|
| 2,131,592 | Lange et al. | Sept. 27, 1938 |
| 2,361,533 | Endress et al. | Oct. 31, 1944 |
| 2,487,499 | Webb | Nov. 8, 1949 |
| 2,642,469 | Gary | June 16, 1953 |
| 2,653,179 | Baldwin | Sept. 22, 1953 |
| 2,798,110 | Peters | July 2, 1957 |
| 2,842,607 | Germarshausen et al. | July 8, 1958 |

FOREIGN PATENTS

| | | |
|---|---|---|
| 741,345 | Great Britain | Nov. 30, 1945 |